United States Patent [19]

Candlin et al.

[11] 4,134,855

[45] Jan. 16, 1979

[54] PRODUCTION OF TRANSITION METAL COMPOSITION

[75] Inventors: John P. Candlin, Aston, Nr. Stevenage; John A. A. G. Segal, London, both of England

[73] Assignee: Imperial Chemical Industries Limited, London, England

[21] Appl. No.: 822,908

[22] Filed: Aug. 8, 1977

[30] Foreign Application Priority Data

May 25, 1977 [GB] United Kingdom ............... 22045/77

[51] Int. Cl.$^2$ ............................ C08F 4/10; C08F 4/50; C08F 4/64; C08F 4/68
[52] U.S. Cl. ............................ 252/429 B; 252/431 R; 252/431 C; 252/431 N; 252/431 P; 526/119; 526/123; 526/124; 526/127; 526/139; 526/140; 526/141; 526/142; 526/137; 526/143; 526/159; 526/160
[58] Field of Search ........... 252/429 B, 431 R, 431 N, 252/431 P, 431 C

[56] References Cited

U.S. PATENT DOCUMENTS

| 3,492,281 | 1/1970 | Smith et al. ................... 252/429 B X |
| 3,494,873 | 2/1970 | Vohwinkel et al. ............. 252/429 B |
| 3,558,515 | 1/1971 | Kittleman et al. ............... 252/429 B |
| 3,738,944 | 6/1973 | Candlin et al. ............... 252/429 B X |
| 3,801,558 | 4/1974 | Fletcher et al. ............. 252/429 B X |

OTHER PUBLICATIONS

Lapporte et al., J. Org. Chem., 28, (Jul. 1963), pp. 1947-1948.

*Primary Examiner*—Patrick Garvin
*Attorney, Agent, or Firm*—Cushman, Darby & Cushman

[57] ABSTRACT

A transition metal compound containing at least one $\eta^6$-arene is contacted with a compound of the formula $MX_nY_{2-n}mL$; or $Z_3Al[MgZ_2]_yAlZ_3$ where L, M, X, Y, Z, m, n, and y are defined. The transition metal compound can be a compound such as $TiCl_2 \cdot 2AlCl_3$-arene. The compound of the defined formula may be a solid compound which may be insoluble in hydrocarbon liquids when it may be of high surface area which may be inherent in the solid or can be achieved by a grinding procedure. The compound of the defined formula may be $Mg(OC_2H_5)_2$; $Mg(CH_3)_2$; $Mg(CH_2C_6H_5)_2$; $(C_2H_5)_3Al[Mg(C_2H_5)_2]\cdot Al(C_2H_5)_3$ or $(iC_3H_7O)_3Al(Mg(OiC_3H_7)_2]Al(OiC_3H_7)_3$. During or after the contacting with the transition metal compound, treatment with a halogen-containing compound may be effected. The product of the contacting is useful for the polymerization of olefines.

10 Claims, No Drawings

PRODUCTION OF TRANSITION METAL COMPOSITION

The present invention relates to the treatment of compounds of transition metals and to the use of the treated compounds as components of catalysts for the polymerisation of ethylenically unsaturated hydrocarbon monomers.

According to the present invention a compound of a transition metal of Groups IVA or VA of the Periodic Table, which compound contains at least one $\eta^6$-arene group, is contacted with a compound which (A) has a general formula $MX_nY_{2-n}mL$; or (B) is a mixed aluminium-magnesium compound of the formula:

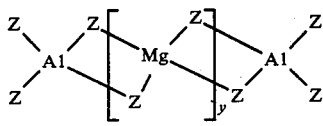

where
M is a metal which is present in the divalent form;
X is a halogen atom excluding fluorine;
Y, or each Y, is, independently, a group —R, —OR, —(CH$_2$)$_x$SiR$_3$ or —OSiR$_3$;
L is an organic Lewis Base compound which contains at least one functional group selected from amine, phosphine, ether and thioether functional groups;
R is a hydrocarbyl group; each Z is, independently, a group —R or —OR;
m has a value from 0 up to 2;
n has a value from 0 up to 1;
x has a value from 1 up to 4; and
y is an integer from 1 up to 20.

For convenience hereafter, compounds of the formula $MX_nY_{2-n}mL$ will be referred to as "compounds of type (A)" and mixed aluminium-magnesium compounds of the formula:

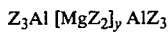

$Z_3Al[MgZ_2]_yAlZ_3$ will be referred to as "compounds of type (B)".

The proportions of the materials which are used may be varied considerably and a molar excess of either material, especially the compounds of type (A) or (B), may be used, for example from 0.01 up to 100, especially from 0.1 up to 10, moles of the transition metal compound for each mole of the compound of type (A) or for each repeat unit present in the compound of type (B).

The transition metal is preferably a metal of Group IVA and is particularly titanium. The transition metal compound may contain only the $\eta^6$-arene group, or may also contain other groupings such as halogen atoms, and the compound may be in the form of a complex with other compounds. In the transition metal compound the valency of the metal may be zero or any valency wherein the transition metal is able to form a stable compound containing at least one $\eta^6$-arene group. Thus, the transition metal compound may be titanium (0) ditoluene. Useful effects have been obtained using, as the transition metal compound, a titanium dichloride-aluminium chloridearene complex compound where the arene group is any suitable arene for example durene(1,2,4,5-tetramethylbenzene), benzene or toluene. The term "arene" as used herein is used to mean a compound containing a six-membered hydrocarbyl ring which ring contains a completely delocalised double-bond system. It will be appreciated that the term arene as used includes not only benzene, toluene and durene, but also xylene, hexamethylbenzene and substituted derivatives thereof such as chlorobenzene.

The compound of type (A) or (B) may be a solid particulate compound which preferably has a high surface area and it will be appreciated that some compounds of this type inherently have such a high surface area whereas with other compounds it is necessary to grind or otherwise comminute the solid compound in order to achieve a satisfactorily high surface area. It is preferred that the surface area of such solid compounds is at least 1 m$^2$/g and it is particularly preferred that the area is at least 10 m$^2$/g and especially 30 m$^2$/g. Alternatively, the compound of type (A) or (B) may be a liquid or a solid material which is soluble in hydrocarbon liquids.

The metal M is a metal which is present in the divalent form and it will be appreciated that such metals include not only metals such as magnesium, which exist predominantly in the divalent form, but also metals such as manganese which are capable of existing in several valency states including the divalent state. It is preferred that M is magnesium. If the compound of type (A) contains the halogen X, it is preferred that this is chlorine or bromine.

In the compound of type (A), the numbers n and m may be zero in which case the compound is of the type MY$_2$. The value of n may be intermediate between 0 and 1 in which case the compound of type (A) may be a mixture of two or more compounds, such as a mixture of C$_2$H$_5$OMgCl and Mg(OC$_2$H$_5$)$_2$ in varying proportions.

The group Y is, or includes, a hydrocarbyl group R which may be an alkyl, aryl, cycloalkyl, alkaryl or aralkyl group. Thus, Y may be, for example, an ethyl, butyl, phenyl, benzyl, ethoxy, phenoxy, trimethylsiloxy or trimethylsilylmethyl group.

The organic Lewis Base compound which is L may be diethyl ether or dioxane.

The compound of type (A) is conveniently Mg(OC$_2$H$_5$)$_2$, Mg(CH$_3$)$_2$ or Mg(CH$_2$C$_6$H$_5$)$_2$, but it will be appreciated that many other materials may be used.

Compounds of type (A) can be prepared using known techniques, for example as described in "Methoden der Organischen Chemie" Vol XIII/2a, (1973) page 46 or "Advances in Inorganic Chemistry and Radiochemistry" Vol 15, (1972) page 259. Compounds in which the value of n is between 0 and 1 may be prepared by mixing, in the appropriate proportions, a compound of the type MY$_2$ with a compound of the type MX$_2$ or MXY, such mixing conveniently being effected in solution or by grinding the two compounds together, which grinding may be effected in the absence of any added inert liquids.

In compounds of type (B), if the group Z is a hydrocarbyl group, it is preferably an alkyl roup such as an ethyl group, and y is an integer which is preferably up to 6. If the group Z is a group —OR, it is preferably an alkoxy group such as an isopropoxy or n-butoxy group, and y is 1.

Compounds of type (B) include (C$_2$H$_5$)$_3$Al[Mg(C$_2$H$_5$)$_2$]Al(C$_2$H$_5$)$_3$ and (iC$_3$H$_7$O)$_3$Al[Mg(OiC$_3$H$_7$)$_2$]Al(OiC$_3$H$_7$)$_3$.

Compounds of type (B) in which Z is a hydrocarbyl group can be prepared by the reaction between an aluminium trihydrocarbyl and a magnesium dihydrocarbyl as described in "Journal of Organometallic Chemistry" Vol 93, (1975) page 1. Compounds of type (B) in which Z is a group —OR can be prepared by adding an alkanol to a mixture of aluminium and magnesium powder in the atomic ratio of 2 to 1, as described in "Journal of Organic Chemistry" Vol 8, (1943) page 256.

The contacting of the compound of type (A) or (B) with the transition metal compound may be effected in the presence of, or the product of such contacting may be treated with, a halogen-containing compound which may be either an organic or inorganic compound. Suitable halogen-containing compounds include hydrogen chloride, titanium tetrachloride and toluoyl chloride. The amount of the halogen-containing compound which is used is preferably at least 0.10 moles per g atom of transition metal which is present in the transition metal compound, and is very preferably at least 0.5 moles per g atom of the transition metal compound. Very conveniently a molar excess of the halogen-containing compound is used and any excess of the halogen-containing compound which remains after completion of the treatment may be removed using any suitable technique such as filtration and/or washing with an inert liquid.

In addition to, or as an alternative to, the treatment with the halogen-containing compound, the contacting of the compound of type (A) or (B) and the transition metal compound may be effected in the presence of, or the product of such contacting may be treated with, an organic Lewis Base compound. A wide range of organic Lewis Base compounds have been proposed for use as components of Ziegler catalyst systems, and any such compounds may be used. Thus, the organic Lewis Base compound may be an ether; an ester; a ketone; an alcohol; a sulphur-containing analogue of ethers, esters, ketones and alcohols; a sulphone; a sulphonamide; a fused ring compound containing a heterocyclic sulphur atom; an organosilicon compound; an amide; urea or thiourea; an amine, which term is used to include alkanolamines, cyclic amines and diamines; or an organo-phosphorus compound such as an organo-phosphine, an organo-phosphine oxide, an organo-phosphite or an organo-phosphate. The use of organic Lewis Base compounds is disclosed inter alia in British Pat. Nos. 803,198, 809,717, 880,998, 896,509, 920,118, 921,954, 933,236, 940,125, 966,025, 969,074, 971,248, 1,013,363, 1,017,977, 1,049,723, 1,122,010, 1,150,845, 1,208,815, 1,234,657, 1,324,173, 1,359,328, 1,383,207, 1,423,658, 1,423,659 and 1,423,660 and Belgian Patent Specification No. 693,551. Suitable sulphones, sulphonamides, and fused ring compounds containing a heterocyclic sulphur atom are disclosed in published German Patent Application 2,600,552. If an organic Lewis Base compound is included in the system, the proportion of the organic Lewis Base compound is preferably at least 0.1 moles per g atom of the transition metal which is present in the transition metal compound and very preferably not more than 5 moles of the organic Lewis Base compound per g atom of transition metal.

The contacting of the transition metal compound with the compound of type (A) or (B) is conveniently effected by contacting the compound of type (A) or (B) with a solution of the transition metal compound in a hydrocarbon or other inert diluent. The contacting may be effected by stirring a suspension or solution of the compound of type (A) or (B) in a suitable inert diluent with a solution of the transition metal compound, or may be effected by grinding the compound of type (A) or (B) in the presence of the transition metal compound, which may, if desired, be in solution in a suitable inert liquid. However, it will be appreciated that if the compound of type (A) or (B) is a solid particulate material, such a solid material may be subjected to a grinding step either before or after it has been contacted with the transition metal compound, and it is not necessary to effect grinding of such a solid material in the presence of the transition metal compound.

The contacting of the transition metal compound with the compound of type (A) or (B) may be effected at any suitable temperature but, since some of the transition metal compounds are thermally unstable, when using such compounds it is preferred to use temperatures of ambient temperature or below. The solvent used for the dissolution of the transition metal compound may be any suitable inert liquid and is conveniently an aromatic liquid since many of the transition metal compounds have a greater solubility in such diluents.

If the compound of type (A) or (B) is a solid particulate material which is subjected to a grinding step, this can be effected in any known manner for example in a rotating ball mill or in a vibrating ball mill. The time of grinding will be dependent on a number of factors including the nature of the material to be ground, the particle size desired in the ground product and the intensity of the grinding. In general a time of from 1 hour up to 100 hours is sufficient to effect the requisite comminution of the solid material. The milling can be effected at any desired temperature which conveniently may be ambient temperature, but a lower temperature may be used if the grinding is being effected in the presence of a thermally unstable transition metal compound.

The product of contacting the transition metal compound with the compound of type (A) or (B) can be used, either alone or together with other compounds such as the organic compound of a non-transition metal of Groups IA and IIA or of aluminium, to polymerise ethylenically unsaturated hydrocarbon monomers.

Thus, as a further aspect of the present invention there is provided a catalyst suitable for the polymerisation of ethylenically unsaturated hydrocarbon monomers, which catalyst contains a transition metal component which is the product of contacting a transition metal compound of a metal of Groups IVA or VA of the Periodic Table, which compound contains at least one $\eta^6$-arene, with a compound which (A) has a general formula $MX_nY_{2-n}mL$; or (B) is a mixed aluminium-magnesium compound of the formula:

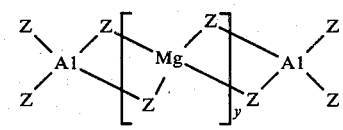

where L, M, X, Y, Z, m, n and y are all as hereinbefore defined.

The catalyst may be a single component catalyst system which consists solely of the transition metal-containing component prepared in the manner hereinbefore described, but the catalyst may include, as a second component, at least one organo-metallic compound of aluminium or of a non-transition metal of Group IIA of the Periodic Table or a complex of an organo-metallic compound of a non-transition metal of Group IA or IIA of the Periodic Table and an organo-aluminium compound.

The second component of the catalyst system can be a Grignard reagent which is substantially ether free or a compound of the type $Mg(C_6H_5)_2$. Alternatively, the second component can be a complex of an organo-metallic compound of a non-transition metal of Groups IA or IIA with an organo-aluminium compound for example $Mg[Al(C_2H_5)_4]_2$ or lithium aluminium tetraalkyl. It is preferred that the second component is an organo-aluminium compound such as a bis(dialkyl aluminium)oxyalkane, a bis(dialkyl aluminium)oxide, an aluminium hydrocarbyl sulphate, an aluminium hydrocarbyloxyhydrocarbyl or particularly an aluminium trihydrocarbyl or dihydrocarbyl aluminium halide or hydride. We particularly prefer to use either an aluminium trialkyl such as aluminium triethyl or an aluminium dialkyl halide such as diethyl aluminium chloride. We particularly prefer that the second component is a halogen-free material for example an aluminium trialkyl.

In addition to the first and second components, the catalyst may also contain other components for example organic Lewis Base compounds. The organic Lewis Base compound may be the same as, or different from, the organic Lewis Base compound with which the compound of type (A) or (B) and the transition metal compound are optionally treated. Thus the organic Lewis Base compound which may be used as a possible third component of the catalyst may be any Lewis Base compound of the type previously described. The optional Lewis Base compound may be incorporated into the catalyst system as a complex with the organo-metallic component of the catalyst. Suitable complexes of the organic Lewis Base compound and the organo-metallic compound include complexes of aluminium trialkyl with esters and in particular with aromatic esters such as ethyl benzoate or ethyl anisate.

In addition to or instead of the organic Lewis Base compound the catalyst may also contain a substituted or unsubstituted polyene. The polyene may be an acyclic polyene such as 3-methylheptatriene-1,4,6 or a cyclic polyene such as cyclooctatriene, cyclooctatetraene or cycloheptatriene or may be a derivative of such cyclic polyenes for example the alkyl- or alkoxy-substituted polyenes, tropylium salts or complexes, tropolone or tropone.

The proportions of the catalyst components can be varied quite widely depending on the particular materials used and the absolute concentrations of the components. The proportions will also be dependent on the monomer which is to be polymerised. However, if the catalyst system includes components in addition to the transition metal component, then these may be present in the conventional proportions for Ziegler catalyst systems. More specifically, for each gramme atom of the transition metal which is present in the product of contacting the transition metal compound with the compound of type (A) or (B), there should be present at least 0.05 and preferably at least 1 mole of the organo-metallic compound which is the second component of the catalyst. However, in general it is preferred to use larger quantities of the organo-metallic component and the proportion of this compound may be as high as 100 moles for each gramme atom of the transition metal compound. However, in general we prefer to use smaller proportions of the organo-metallic compounds, for example not more than 25, and particularly not more than 10 moles, of the second component for each gramme atom of the transition metal. If a Lewis Base component is also present in the catalyst system, the number of moles of the Lewis Base compound should not be greater than the number of moles of the organo-metallic compound which is the second component of the catalyst. If the catalyst includes a polyene, then the molar proportion of the polyene is preferably less than the molar proportion of the second component. Preferably for each mole of the second component there is present from 0.05 up to 0.5 particularly from 0.1 up to 0.2 moles of the polyene.

The catalyst of the present invention can be used to polymerise ethylenically unsaturated hydrocarbon monomers by contacting at least one such monomer with a catalyst of the type hereinbefore described.

More specifically there is provided a process for the production of a hydrocarbon polymer wherein at least one ethylenically unsaturated hydrocarbon monomer is contacted with a polymerisation catalyst of the type hereinbefore described.

The ethylenically unsaturated hydrocarbon monomer may be a mono-olefine and may be any which is capable of being polymerised using a Ziegler catalyst system. Thus, monomers which can be polymerised by the process of the present invention may be mono-olefines containing up to 18 carbon atoms, for example butene-1 and 4-methylpentene-1 and particularly ethylene and propylene. If desired the olefines, particularly ethylene and propylene, may be copolymerised together for example using a sequential polymerisation technique such as is described in British Pat. Nos. 970,478, 970,479 and 1,014,944. The monomer may, alternatively, be a diene or polyene such as, for example, butadiene.

The type of catalyst for the polymerisation will be dependent on monomer being polymerised. If ethylene or a mixture containing ethylene is to be polymerised, the catalyst can consist solely of the product of contacting the transition metal compound with the compound of type (A) or (B). However, if the monomer to be polymerised is propylene or a higher olefine, that is one containing 4 or more carbon atoms, it is preferred that the catalyst system includes a second component which is an organo-metallic compound of aluminium or of a non-transition metal of Group IIA of the Periodic Table, or a complex of a non-transition metal of Group IA or IIA of the Periodic Table and an organo-aluminium compound. For the polymerisation of propylene and higher olefines, it is particularly preferred that the catalyst system also includes an organo-Lewis Base compound.

We have found that the process of the present invention can be used to obtain a high yield of a polymer relative to the amount of the catalyst used. If the polymer being polymerised is propylene, or a higher olefine, then, if the preferred catalyst systems are used, a relatively low proportion of the undesirable soluble polymer may also be obtained.

It is preferred to use monomers (and diluents when required) which have a high degree of purity, for example a monomer containing less than 5 ppm by weight of water and less than 1 ppm by weight of oxygen. Materials having a high degree of purity can be obtained by processes such as those described in British Pat. Nos. 1,111,493, 1,226,659 and 1,383,611.

Polymerisation can be carried out in known manner, for example in the presence or absence of an inert diluent such as a suitably purified paraffinic hydrocarbon, in the liquid phase using excess liquid monomer or in the gaseous phase.

Polymerisation may be effected either in a batch manner or on a continuous basis and the catalyst components may be introduced into the polymerisation vessel separately or all the catalyst components may be mixed together before being introduced into the polymerisation reactor.

The polymerisation can be effected in the presence of a chain transfer agent such as hydrogen or a zinc dialkyl, in order to control the molecular weight of the product formed. If hydrogen is used as the chain transfer agent, it is conveniently used in an amount of from 0.01 up to 5.0%, particularly from 0.10 up to 2.0%, molar relative to the monomer. The amount of chain transfer agent will be dependent on the polymerisation conditions, especially the temperature, which is typically in the range from 15° C. up to 100° C.

Various aspects of the present invention will now be described with reference to the following Examples which are illustrative of the invention. In the Examples, all operations were effected under an atmosphere of nitrogen unless otherwise indicated.

(A) Preparation of titanium dichloride-aluminium chloridebenzene complex 51 grammes of aluminium powder (BDH fine powder) and 80 grammes of anhydrous aluminium chloride were introduced into a two litre, three-necked flask and the mixture of solids was heated at 130° C. for 0.5 hours. The mixture was then allowed to cool. 500 ml of benzene was added and then 33.3 grammes of titanium tetrachloride was added with stirring. The mixture was refluxed for 20 hours and then allowed to cool. The cool solution was filtered into one litre of heptane, and this mixture was cooled to −10° C. and maintained at this temperature for 24 hours. The supernatant liquid was decanted from the purple solid which had been formed. The solid was washed four times using one litre of heptane for each wash, and then was dried under reduced pressure (1 mm mercury) at ambient temperature.

(B) Preparation of Magnesium Ethoxide [$Mg(OC_2H_5)_2$]

Into a 500 ml flask was placed a mixture of 5.0 grammes of magnesium powder (Grade 4 from Magnesium Elektron Limited) and 0.05 grammes of iodine. A nitrogen atmosphere was established within the flask and 150 ml of ethanol, which had been dried using activated molecular sieves (BDH Limited, Grade 4A, activated by heating in nitrogen at 400° C.) and then distilled, was added. The suspension obtained was stirred and heated under reflux for 5 hours. The ethanol was then distilled off to give a white solid which was dried at 120° C. for 2 hours.

(C) Preparation of Dibenzylmagnesium [$Mg(CH_2C_6H_5)_2$]

58 ml of benzyl chloride, which had been dried over magnesium sulphate, was added dropwise over a period of 1.5 hours to a vessel maintained at a temperature in the range 0° to −10° C. and containing a stirred suspension of 14.5 grammes of magnesium turnings in 500 ml of dry ether under a nitrogen atmosphere. Stirring was continued and the mixture was allowed to warm up to ambient temperature over a period of 1 hour. Stirring was stopped, the suspension allowed to settle and the supernatant liquid, containing a Grignard reagent, was filtered off. Analysis of a 2 ml aliquot of the filtrate, by addition of excess acid and back-titration, showed a yield of 94% based on the benzyl chloride.

The filtrate was heated to reflux temperature and 45 ml of purified dioxane was added dropwise over a period of 15 minutes. A white precipitate started to form. Refluxing was continued for a further 1 hour, heating was stopped and the mixture was stirred and allowed to cool over a period of 1 hour. Stirring was stopped and the fine white precipitate allowed to settle over a period of 48 hours. The supernatant solution was decanted off, the residual solid washed with ether and the washings combined with the supernatant solution. Analysis of this combined solution showed no detectable chlorine content. The solvent was evaporated to give dibenzylmagnesium as a white powder.

(D) Preparation of $Mg[Al(OiC_3H_7)_4]_2$

The preparation described in Journal of Organic Chemistry Vol 8, (1943) page 256, was effected using 24.0 grammes of magnesium powder, 27.0 grammes of aluminium powder and one litre of dried isopropanol. A yield of 450 grammes of solid was obtained.

EXAMPLE 1

50 ml of a 0.423 M solution, in benzene, of the product of preparation A was placed in a 500 ml Schlenk tube under an atmosphere of nitrogen. To this solution was added, dropwise, a suspension of 6.1 grammes of magnesium ethoxide (prepared as described in preparation (B) in 50 ml of heptane. The mixture obtained was stirred overnight at ambient temperature (about 20° C.) and then heated at 80° C. for 1 hour, whilst continuing to stir. Stirring was stopped and the reaction mixture was allowed to cool to ambient temperature. The clear supernatant liquid was filtered off, the dark particulate solid residue washed once with 100 ml of heptane and then suspended in 100 ml heptane.

EXAMPLE 2

10 ml of the heptane suspension obtained in Example 1 (which contained 2.1 mM of titanium) was added to a two litre flask containing one litre of dry heptane saturated with ethylene. The flask was maintained at 20° C. and ethylene was admitted to maintain the pressure at atmospheric pressure. After 2.5 hours, 20 ml of isopropanol was added to the contents of the flask, and the mixture was filtered. The polyethylene obtained was dried, in a hot air oven, at 80° C. The yield of polyethylene was 55 grammes.

EXAMPLE 3

10 ml of the heptane suspension obtained in Example 1 was added to a one litre flask containing 400 ml of dry heptane saturated with heptane and maintained at 45° C. 8 ml of a 1 M solution of aluminium triethyl in heptane was then added. Propylene was admitted to the flask to maintain the pressure at atmospheric pressure. After 0.5 hours, 20 ml of isopropanol was added to the contents of the flask and the mixture was filtered. 9 grammes of insoluble polypropylene was obtained which was dried, in a hot air oven, at 80° C. 5 grammes of soluble polypropylene was obtained by evaporation of the filtrate.

EXAMPLE 4

1.7 grammes of dibenzylmagnesium (prepared as described in preparation (C) was added to 12 ml of dry toluene which was being stirred in a 200 ml Schlenk tube. To the contents of the Schlenk tube were added dropwise 8 ml of a 0.423 M solution, in benzene, of the product of preparation A. The contents of the tube were stirred and heated to 80° C. for 5 minutes, and then allowed to cool.

EXAMPLE 5

10 ml of the stirred suspension obtained by the process of Example 4 was added to a two litre flask containing one litre of dry heptane saturated with ethylene at 29° C. 8 ml of a 1 M solution of aluminium triethyl in heptane was then added to the contents of the flask which were being stirred. Ethylene was then admitted to the flask at a rate sufficient to maintain the pressure at 31 cm of mercury (absolute). After 3 hours, 30 ml of isopropanol was added and the mixture was filtered. A yield of 84 gammes of polyethylene was obtained, which was dried in an air oven at 80° C.

EXAMPLE 6

1.1 grammes of dimethyl magnesium was added to 25 ml of dry toluene which was being stirred in a 200 ml Schlenk tube. To the contents of the Shlenk tube were added, dropwise, 17 ml of a 0.423 M solution, in benzene, of the product of preparation A. The contents of the Schlenk tube were stirred and heated to 80° C. for 5 minutes, and then allowed to cool.

EXAMPLE 7

21 ml of the stirred suspension obtained by the process of Example 6 was added to a two litre flask containing one litre of dry heptane saturated with ethylene at 29° C. 8 ml of a 1 M solution of aluminium triethyl in heptane was then added to the contents of the flask which were being stirred. Ethylene was then admitted to the flask at a rate sufficient to maintain the pressure at atmospheric pressure. After 2.25 hours, 30 ml of isopropanol was added and the mixture was filtered. A yield of 58 grammes of polyethylene was obtained, which was dried in an air oven at 80° C.

EXAMPLE 8

The procedure of Example 3 was repeated using 12 ml of the stirred suspension obtained by the process of Example 6, a temperature of 30° C. and a polymerisation time of 1.5 hours. 9 grammes of insoluble polypropylene was obtained which was dried, in a hot air oven, at 80° C. 2.2 grammes of soluble polypropylene was obtained by evaporation of the filtrate.

EXAMPLE 9

Into a 500 ml three-necked flask was introduced a solution of 10 grammes of the product of preparation D in 100 ml of toluene. The contents of the flask were stirred and 43 ml of a 0.423 M solution, in benzene, of the product of preparation A, was added dropwise. A dark solid was precipitated, allowed to settle and washed twice using 200 ml of toluene for each wash and five times using 200 ml of heptane for each wash. The solid was finally suspended in 200 ml of heptane to give a suspension containing 16.2 mM of reduced titanium species.

A portion of the suspension obtained, containing about 14 mM of reduced titanium species, was retained in the 500 ml flask and hydrogen chloride gas was then passed slowly into the stirred suspension at ambient temperature. The passage of the gas was continued until it was observed that excess of the gas was passing through the suspension and out of an exit tube attached to the flask. This process took about 1 hour. The suspension thus obtained was allowed to settle, the supernatant liquid was removed by decantation. The solid was washed six times using 200 ml of heptane for each wash. No chlorine ions could be detected, by a silver nitrate test, in the liquid from the final wash. The solid was finally suspended in 200 ml of heptane to give a suspension containing 12 mM of reduced titanium species.

EXAMPLE 10

The procedure of Example 3 was repeated at ambient temperature using sufficient of the suspension obtained in Example 9 to provide 2 mM of reduced titanium species. Propylene polymerisation was effected at atmospheric pressure for 2 hours. 12 grammes of insoluble propylene was obtained which was dried, in a hot air oven, at 80° C. 6.9 grammes of soluble polypropylene was obtained by evaporation of the filtrate.

Using a product obtained according to the first stage of the procedure of Example 9 (that is omitting the treatment with hydrogen chloride gas), no polymerisation activity could be detected when using ethylene as the monomer.

We claim:
1. A process which comprises contacting a compound of a transition metal of Group IVA or VA of the Periodic Table with an organo-metallic compound, wherein the compound of the transition metal contains at least one $\eta^6$-arene group and is selected from compounds containing only the transition metal and the $\eta^6$-arene group or groups, and titanium dichloride-aluminium chloride-arene complex compounds, and the organo-metallic compound is a compound which (A) has a general formula $MX_nY_{2-n}mL$; or (B) is a mixed aluminium-magnesium compound of the formula:

$Z_3Al[MgZ_2]_yAlZ_3$ where
M is a metal which is present in the divalent form selected from magnesium and manganese;
X is a halogen atom excluding fluorine;
Y, or each Y, is, independently, a group —R, —OR, —(CH$_2$)$_x$SiR$_3$ or —OSiR$_3$;
L is an organic Lewis Base compound which is a hydrocarbyl compound containing at least one functional group selected from amine, phosphine, ether and thioether functional groups;
R is a hydrocarbyl group;
each Z is, independently, a group —R or —OR;
m has a value from 0 up to 2;
n has a value from 0 up to 1;
x has a value from 1 up to 4; and
y is an integer from 1 up to 20.

2. The process of claim 1 wherein the transition metal compound is contacted with the compound of type (A) or type (B) in the presence of an organic or inorganic halogen-containing compound selected from hydrogen chloride, titanium tetrachloride and toluoyl chloride.

3. The process of claim 1 including the additional step of treating the product of contacting the transition metal compound with the compound of type (A) or type (B) by contacting said product, at a temperature not exceeding ambient temperature, with an organic or inorganic halogen-containing compound selected from the group consisting of hydrogen chloride, titanium tetrachloride and toluoyl chloride.

4. The process of claim 1 wherein the transition metal compound is contacted with the compound of type (A) or type (B) in the presence of an organic Lewis Base compound which is an hydrocarbyl ether; an hydrocarbyl ester; an hydrocarbyl ketone; an hydrocarbyl alcohol; a sulphur-containing analogue of the hydrocarbyl ethers, esters, ketones andd alcohols; an hydrocarbyl sulphone; an hydrocarbyl sulphonamide; a fused ring hydrocarbyl compound containing a heterocyclic sulphur atom; an hydrocarbyl organo-silicon compound; an hydrocarbyl amide; urea; thiourea; an hydrocarbyl amine; an hydrocarbyl alkanolamine; an hydrocarbyl diamine; an hydrocarbyl phosphine; an hydrocarbyl phosphine oxide; an hydrocarbyl phosphite or an hydrocarbyl phosphate.

5. The process of claim 1 including the additional step of treating the product of contacting the transition metal with the compound of type (A) or type (B) by contacting said product, at a temperature not exceeding ambient temperature, with an organic Lewis Base compound which is an hydrocarbyl ether; an hydrocarbyl ester; an hydrocarbyl ketone; an hydrocarbyl alcohol; a sulphur-containing analogue of the hydrocarbyl ethers, esters, ketones and alcohols; an hydrocarbyl sulphone; an hydrocarbyl sulphonamide; a fused ring hydrocarbyl compound containing a heterocyclic sulphur atom; an hydrocarbyl organo-silicon compound; an hydrocarbyl amide; urea; thiourea; an hydrocarbyl amine; an hydrocarbyl alkanolamine; an hydrocarbyl diamine; an hydrocarbly phosphine; an hydrocarbyl phosphine oxide; an hydrocarbly phosphite or an hydrocarbyl phosphate.

6. The product of contacting a compound of a transition metal of Group IVA or VA of the Periodic Table with an organo-metallic compound, wherein the compound of the transition metal contains at least one $\eta^6$-arene group and is selected from compounds containing only the transition metal and the $\eta^6$-arene group or groups, and titanium dichloride-aluminium chloride-arene complex compounds, and the organo-metallic compound is a compound which (A) has a general formula $MX_nY_{2-n}mL$; or (B) is a mixed aluminium-magnesium compound of the formula:

$$Z_3Al[MgZ_2]_yAlZ_3$$

where
M is a metal which is present in the divalent from selected from magnesium and manganese;
X is a halogen atom excluding fluorine;
Y, or each Y, is, independently, a group —R, —OR, —(CH$_2$)$_x$SiR$_3$ or —OSiR$_3$;
L is an organic Lewis Base compound which is a hydrocarbyl compound containing at least one functional group selected from amine, phosphine, ether and thioether functional groups;
R is a hydrocarbyl group;
each Z is, independently, a group —R or —OR;
m has a value from 0 up to 2;
n has a value from 0 up to 1;
x has a value from 1 up to 4; and
y is an integer from 1 up to 20.

7. In a catalyst for the polymerisation of ethylenically unsaturated hydrocarbon monomers which catalyst comprises a compound of a transition metal and at least one organo-metallic compound of aluminium, or of a non-transition metal of Group IIA of the Periodic Table, or a complex of an organo-metallic compound of a non-transition metal of Group IA or IIA of the Periodic Table, and an organo-aluminium compound, the improvement which comprises using the product of claim 6 as the compound of the transition metal.

8. The process of claim 1 wherein from 0.01 up to 100 moles of the transition metal compound are contacted with each mole of the compound of type (A) or with each repeat unit present in the compound of type (B).

9. The process of claim 1 wherein the compound of type (A) is C$_2$H$_5$OMgCl; Mg(OC$_2$H$_5$)$_2$; a mixture of C$_2$H$_5$OMgCl and Mg(OC$_2$H$_5$)$_2$; Mg(CH$_3$)$_2$ or Mg(CH$_2$C$_6$H$_5$)$_2$.

10. The process of claim 1 wherein the compound of type (B) is (C$_2$H$_5$)$_3$Al[Mg(C$_2$H$_5$)$_2$]Al(C$_2$H$_5$)$_3$ or (iC$_3$H$_7$O$_3$Al[Mg(OiC$_3$H$_7$)$_2$]Al(OiC$_3$H$_7$)$_3$.

* * * * *